(12) United States Patent
Tsao (10) Patent No.: US 6,883,511 B1
(45) Date of Patent: Apr. 26, 2005

(54) PORTABLE STONE CUTTER

(76) Inventor: Wen-Hai Tsao, P.O. Box 697, Feng-Yuan City, Taichung Hsien (TW) 420

(*) Notice: Subject to any disclaimer, the term of this patent is extended or adjusted under 35 U.S.C. 154(b) by 0 days.

(21) Appl. No.: 10/686,655

(22) Filed: Oct. 17, 2003

(51) Int. Cl.[7] .................................................. B28D 1/03
(52) U.S. Cl. .............................. 125/13.03; 125/13.01; 125/13.02; 125/16.01; 451/356; 83/859
(58) Field of Search ..................... 451/361; 125/13.01, 125/13.02, 12, 16.01, 23.02, 35; 83/859, 83/432, 435, 477, 468.3, 527.18, 532.18

(56) References Cited

U.S. PATENT DOCUMENTS

| | | | | |
|---|---|---|---|---|
| 3,621,829 A | * | 11/1971 | Harclerode | 125/13.03 |
| 3,807,095 A | * | 4/1974 | Harding et al. | 125/13.03 |
| 4,428,159 A | * | 1/1984 | Sigetich et al. | 451/213 |
| 5,676,124 A | * | 10/1997 | Lee | 125/13.01 |
| 5,746,193 A | * | 5/1998 | Swan | 125/13.03 |
| 6,152,127 A | * | 11/2000 | Fuhrman et al. | 125/35 |
| 6,272,961 B1 | * | 8/2001 | Lee | 83/581 |
| 6,276,990 B1 | * | 8/2001 | Greenland | 451/11 |
| 6,439,218 B1 | * | 8/2002 | Hulett | 125/13.01 |
| 6,672,188 B1 | * | 1/2004 | Lee | 83/168 |
| 6,679,244 B1 | * | 1/2004 | Tsao | 125/13.01 |
| 6,752,140 B1 | * | 6/2004 | Fuhrman et al. | 125/13.03 |

* cited by examiner

Primary Examiner—George Nguyen (57) ABSTRACT

An improved portable stone cutter includes a base which is of a rectangular frame composed of a plurality of longitudinal bars, a pair of transverse bars and a pair sliding bars, a working table slidably secured to the sliding bars, a motor disposed on the front end of the frame and sustained by an arcuate support arm and a supplementary support arm which are releasably and rotatably secured to a pair of outmost longitudinal bars, a guarded circular saw blade connected to the motor and operated by the motor via a belt and a transmission shaft and a tool plate movably disposed to one of the outmost longitudinal bars. The feature is that the arcuate support arm and the supplementary support arm define a large space to permit a large piece of stone passing through the saw blade and both the supplementary support arm and the tool plate are removable to reduce the volume of the stone cutter to conveniently pack for transportation.

4 Claims, 8 Drawing Sheets

PORTABLE STONE CUTTER

BACKGROUND OF THE INVENTION

The present invention relates to stone cutting apparatus and more particularly to an improved portable stone cutter by which a large piece of stone can be cut.

Figure 1:
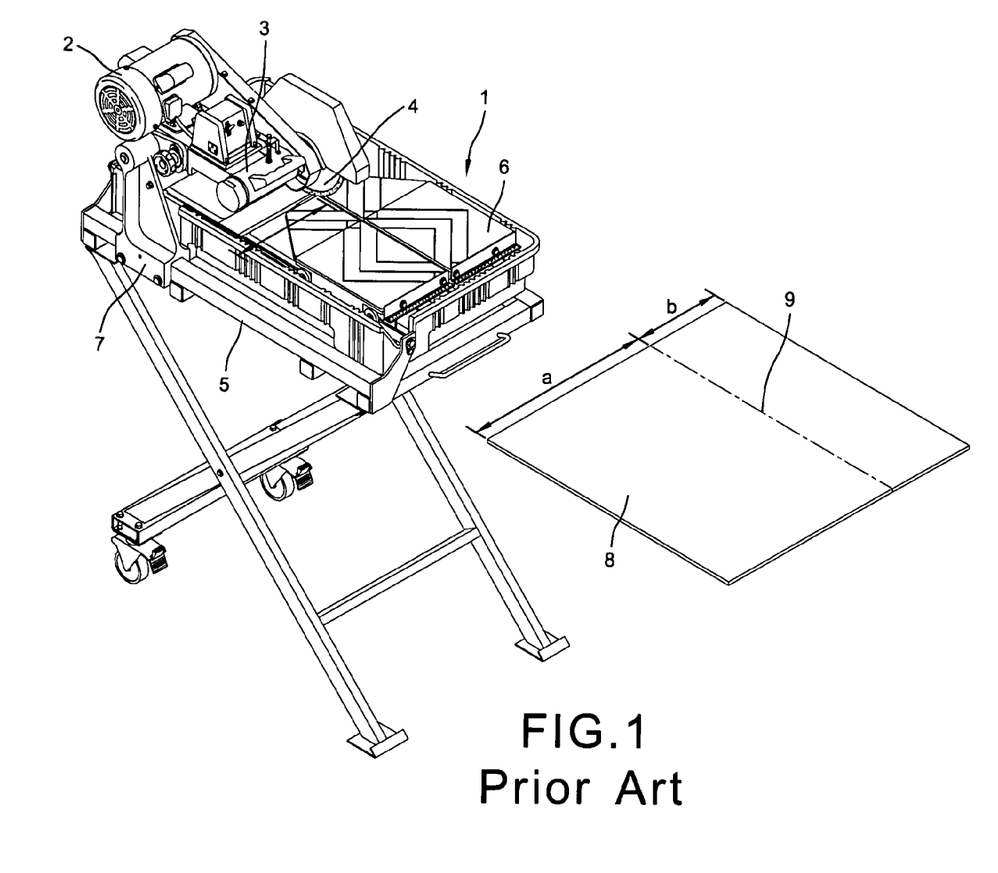
FIG. 1 is a perspective view of a portable stone cutter according to a prior art.

FIG. 1 shows a prior art portable stone cutter 1 which comprises generally a motor 2 sustained by a support arm 7, a transmission shaft 3 actuated by the motor 2 via a belt to operate a circular saw blade 4, a slidable table 6 disposed on a base 5. So that a piece of stone 8 can be put on the table 6 to slidably cut by the circular saw blade 4. This type of portable stone cutter 1 can only suit to cut small piece of stone and very difficult to cut a large sized piece of stone. For instance, if a large sized piece of stone 8 is to be cut and cutting line nears one side, the support arm 7 will hinder the stone 8 from moving forward except turn it for 180 degrees to avoid the support arm 7 from obstructing the movement of the stone 8. However, if the wide b larger than wide a, a large porting of the stone 8 should be exposed to outside of the table 6. So that the hands of the operator could not accurately control the stone. Thus the result is not ideal or subjected to project upward.

SUMMARY OF THE PRESENT INVENTION

The present invention has a main object to provide an improved portable stone cutter which suits to cut large or small sized piece of stone and to enable the operator to precisely control the movement of the working piece toward the saw blade, thus the cutting result is acceptable. Another object of the present invention is to provide an improved portable stone cutter which does not enlarge the volume in comparison with the prior art portable stone cutter in order to facilitate the packing for transportation.

Further object of the present invention is to provide an improved portable stone cutter in which a movable tool plate is provide to enable the operator to put tools required.

Accordingly, the improved portable stone cutter of the present invention comprises generally a framed base, a working table slidably disposed on a pair of longitudinal sliding bars of the base, a motor sustained by an arcuate support arm on front end of the base, a supplementary support arm on a front end of the base opposite to the support arm, a guarded circular saw blade on a front portion of the base operated by the motor via a transmission shaft and a belt, and a tool plate movably disposed on a lateral side of the base.

The present invention will become more fully understood by reference to the following detailed description thereof when read in conjunction with the attached drawings.

DETAILED DESCRIPTION OF THE PREFERRED EMBODIMENT

Figure 4:
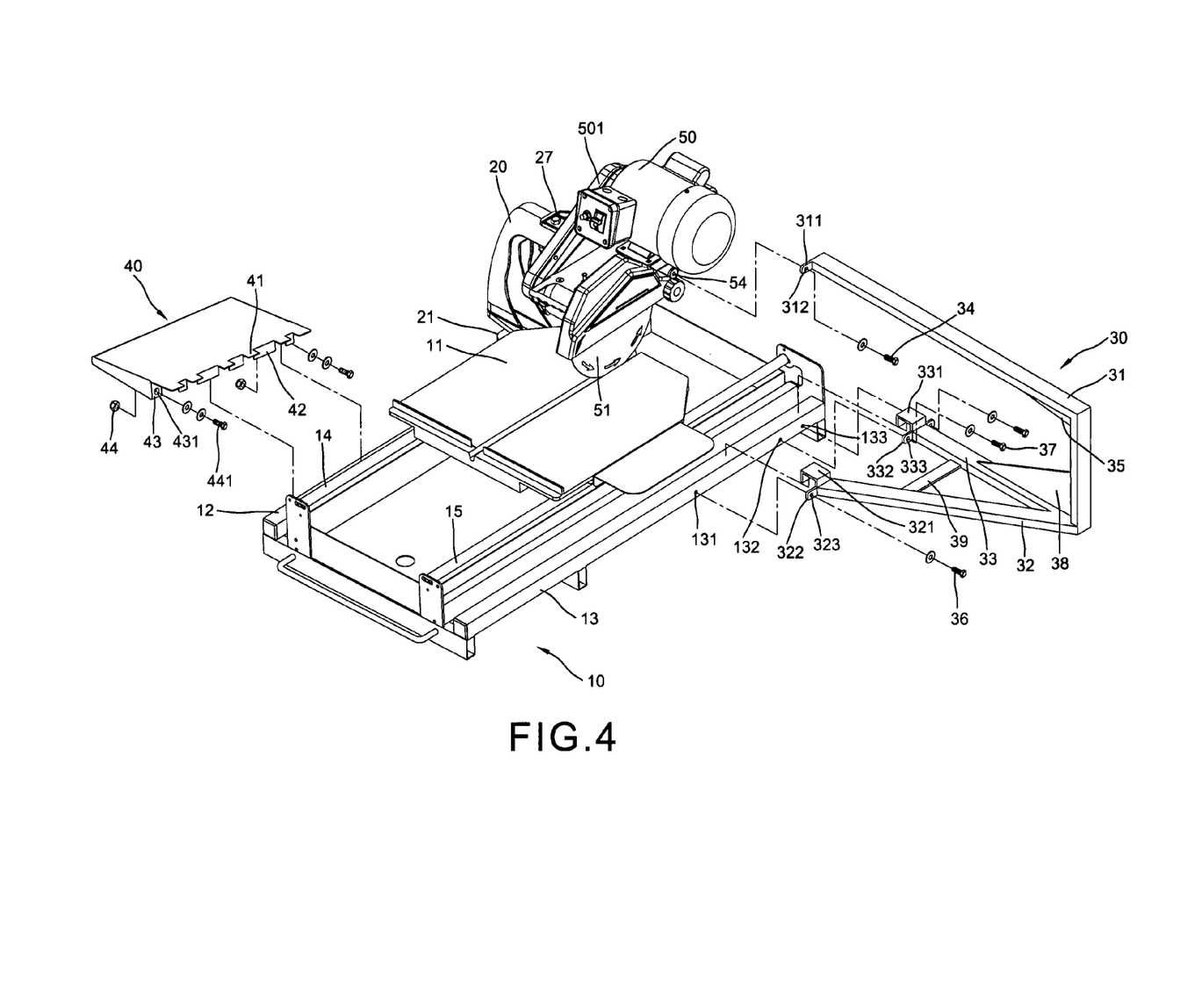
FIG. 4 is an exploded perspective view to show the details of the L-shaped support frame and the movable tool plate.
Figure 5:
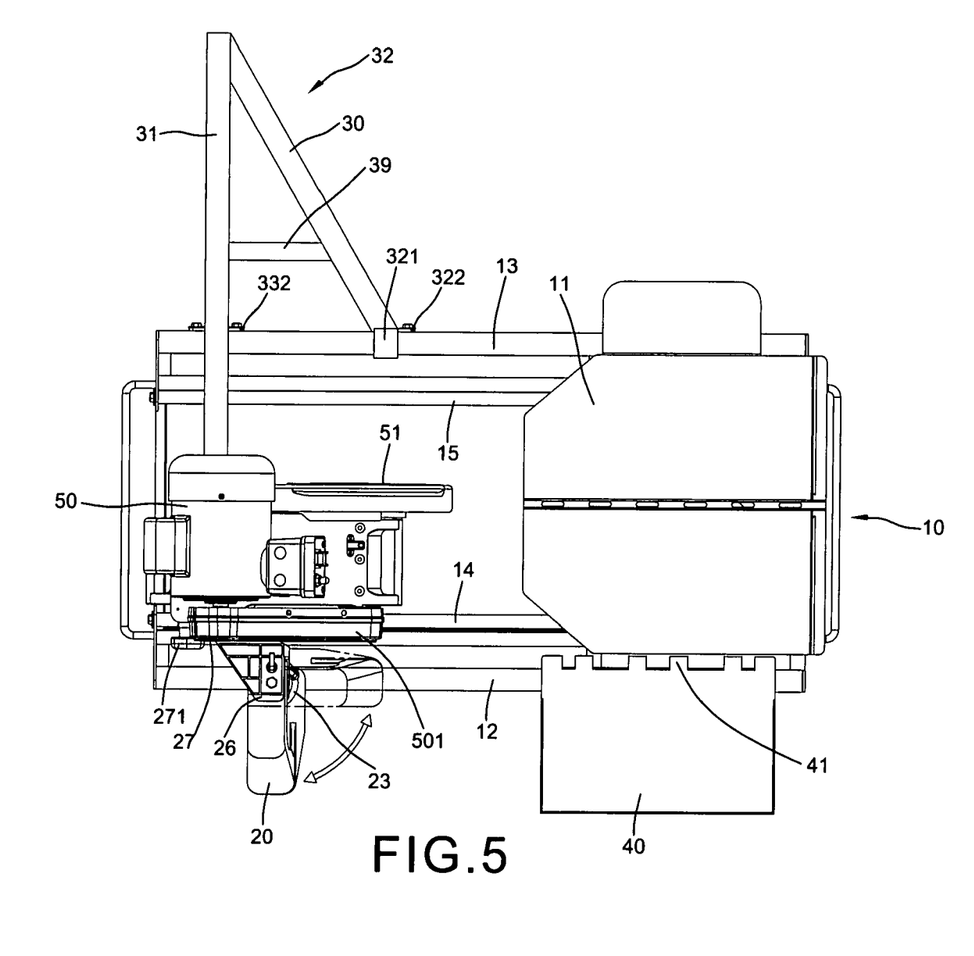
FIG. 5 is a top view of the portable stone cutter of the present invention.
Figure 6:
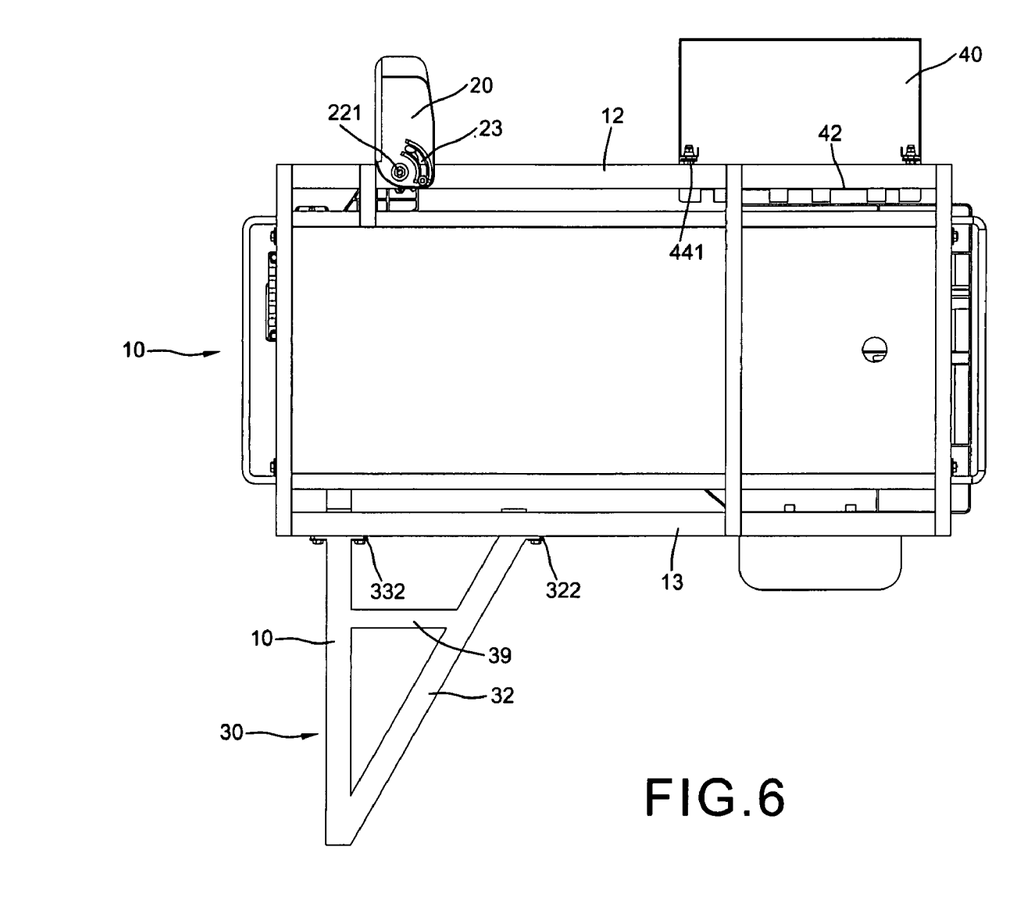
FIG. 6 is an underside view of the portable stone cutter of the present invention.
Figure 7:
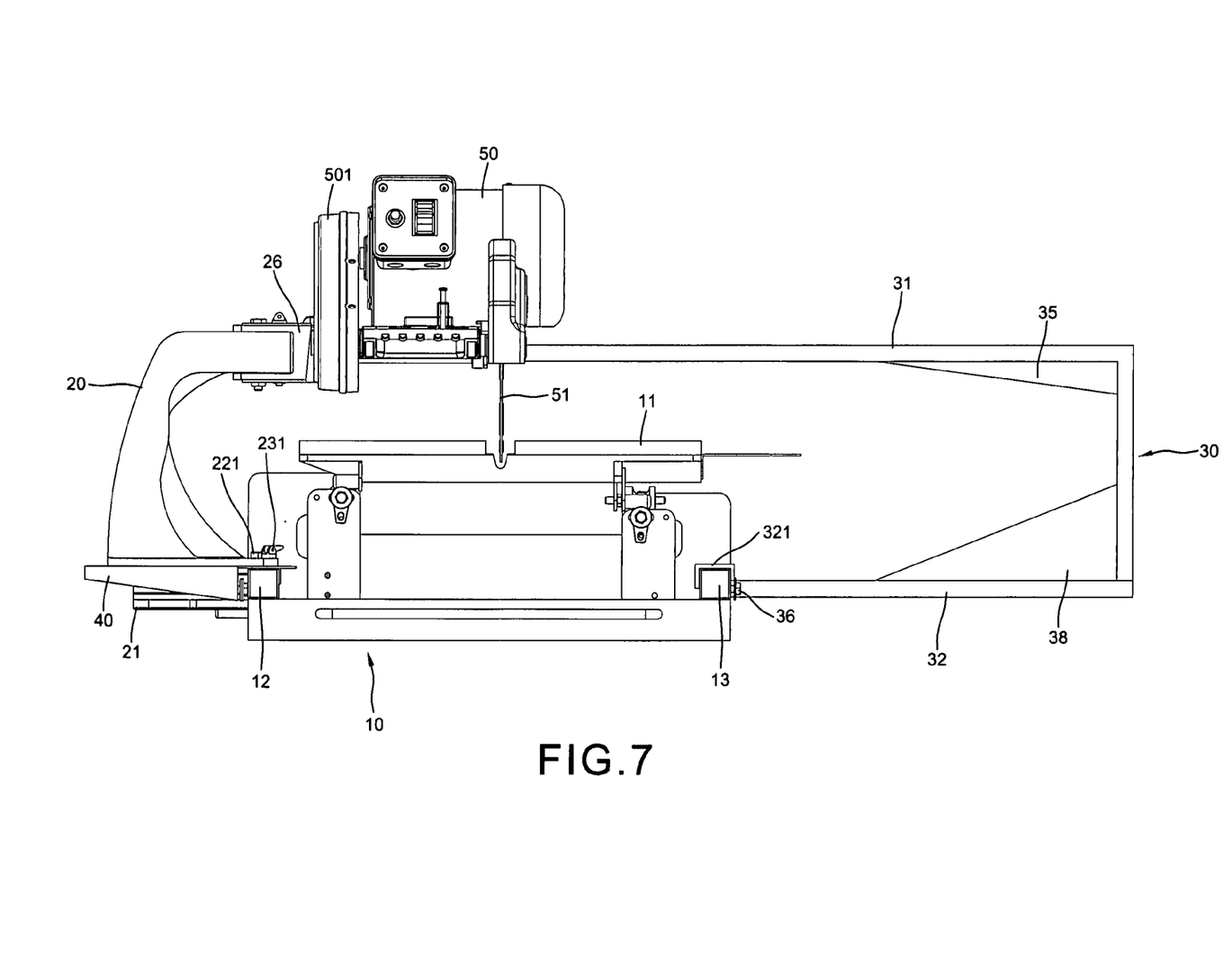
FIG. 7 is a rearside view of the portable stone cutter of the present invention.
Figure 8:
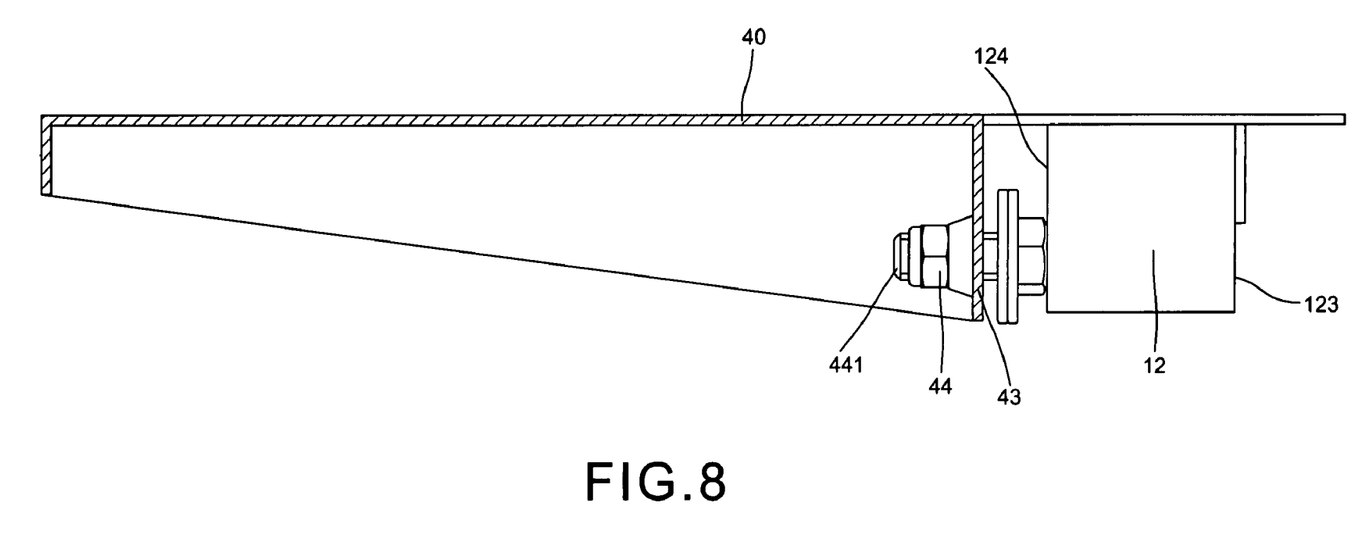
FIG. 8 is a sectional view to show the connection of the tool plate with a lateral bar of the base.

With reference to FIGS. 2 to 7 of the drawings, the improved portable stone cutter of the present invention comprises a base 10 which is of a rectangular frame composed of a pair of longitudinal bars and a pair of transverse bars, a pair of first and second outer longitudinal bars 12 and 13 respectively disposed on the outmost lateral side of the base 10, a pair of longitudinal sliding bars 14 and 15 spacedly disposed inside the base 10 and a working table 11 slidably disposed on the pair of longitudinal sliding bars 14 and 15 wherein the first outer longitudinal bar 12 has a pair of vertical through holes 121 and 122 spacedly formed in a front portion, and the second outer longitudinal bar 13 has three horizontal screw holes 131, 132 and 133 spacedly formed in front portion either, an arcuate support arm 20 including a clamp 21 on lower end clamping on the first outer longitudinal bar 12 having an aligned central hole 22 engaged with the vertical through hole 121 and rotatably secured by a screw 221 and a crescent slot 23 engaged with the through hole 122 and secured by an adjustment lock 231 so that the arcuate support arm 20 can be rotated on the screw 221 and the crescent slot 23 may slide or secure by the adjustment lock 231, a vertical through hole 24 and a vertical screw hole 25 spacedly formed in the top of the arcuate support arm 20 and a tubular pin 242 inserted into the through hole 24, an U-shaped clamp 26 clamped on the upper end of the arcuate support arm 20 having a pair of through holes 261 and 262 spacedly formed in upper portion, a through hole 263 in the lower portion thereof made in registry with the through hole 261 and the through hole 24 and secured by screw 241 and nut 243 whereas the through hole 262 engaged with the screw hole 25 and secured by an adjustment lock 251 and a coupling plate 27 on a lateral side of the U-shaped clamp 26 including a through hole 272 engaged with a screw hole 52 under a motor 50 on front end of the base 10 and secured by a knobbed screw 271, the motor 50 having a first tubular screw hole 53 on one of the lateral sides secured to an inner surface of the coupling plate 27, a supplementary support arm 30 disposed to a front lateral side of the base 10 opposite to the arcuate support arm 20 and composed of a L-shaped upper bar 31 and an A-shaped seat wherein the L-shaped upper bar 31 has a lateral coupling plate 311 including a through hole 312 at free end engaged with a second protrudent screw hole 54 of the motor 50 positioned opposite to the first protrudent screw hole 53 and releasably secured by screw 34, a small triangular reinforcement plate 35 inside the junction and a lower end integrated with the peak of the A-shaped seat which is combined with a first and second tilt bars 32 and 33 and a reinforcement transverse bar 39, the first tilt bar 32 having an inverse U-shaped clamp 321 and a lateral coupling plate 322 including a through hole 323 at free end respectively engaged with the second outer longitudinal bar 13 and the screw hole 131 and releasably secured by screw 36, the second tilt bar 33 having an inverse U-shaped clamp 331 and a pair of lateral coupling plates 332 each including a through hole 333 respectively engaged with the second outer longitudinal bar 13 and the screw holes 132 and 133 and releasably secured by two screws 37, and a large triangular reinforcement plate 38 integrated within the junction between the L-shaped upper bar 31 and the A-shaped seat, a guarded circular saw blade 51 disposed to a front portion of the base 10 connected with and operated by the motor 50 via a belt 501 and a transmission shaft 502, finally, a tool plate 40 movably connected to the first outer longitudinal bar 12 (as shown in FIGS. 4 and 8). The tool plate 40 has a plurality of horizontal protrudent pieces 41 and a plurality of vertical protrudent pieces 42 alternately formed along the front edge, a pair of introverted hollow interior lateral walls 43 under lateral edges each including a screw hole 431 in front end and each of the screw holes 431 having a hollow frustum means on inner side and a pair of bolts 441 screwed into the screw holes 431 and secured by nut 44. When assembles the tool plate 40 with the base 10, the vertical protrudent pieces 42 stops against the inner side 123 of the first outer longitudinal bar 12 and the head of the bolts 441 stop against the outer side 124 of the first outer longitudinal bar 12. So that the tool plate 40 is fixed. If turn the head of the bolts 441 clockwise to move the bolts 441 inward, the tool plate 40 is loosened up and enables to slide along the first outer longitudinal bar 12 or to remove from the base 10.

Figure 2:
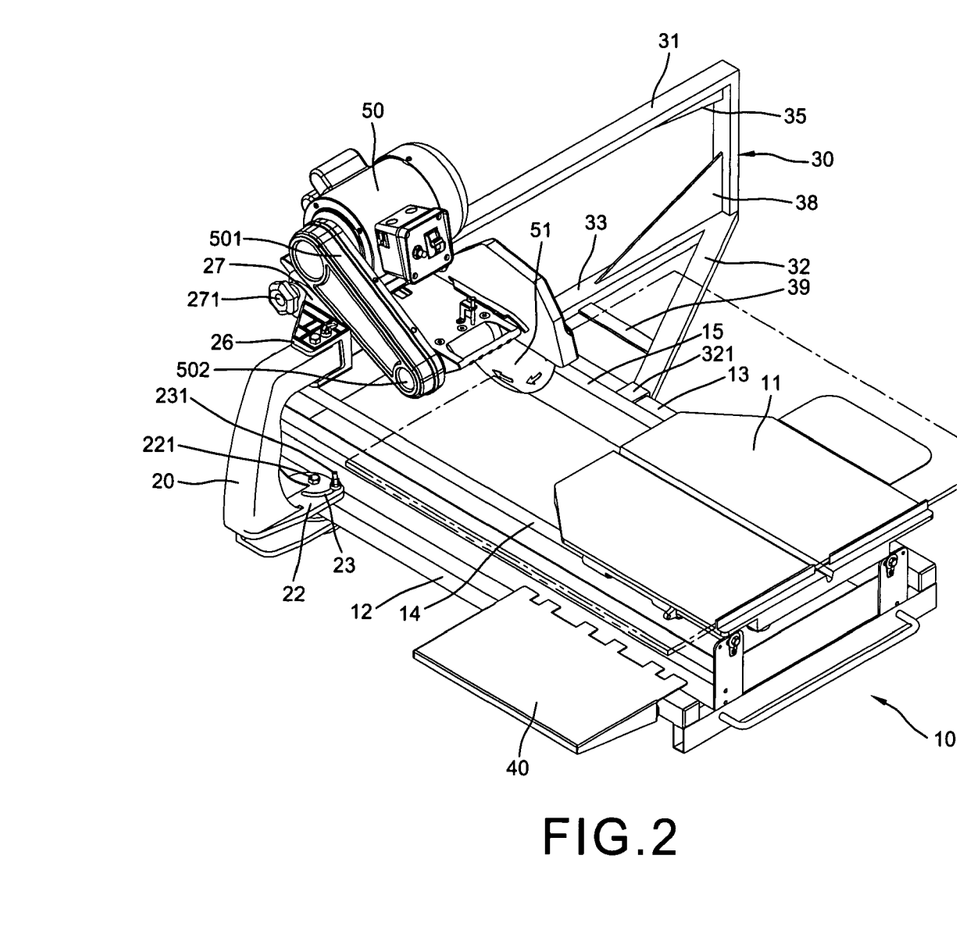
FIG. 2 is a perspective view to show a portable stone cutter of the preferred embodiment according to the present invention.
Figure 3:
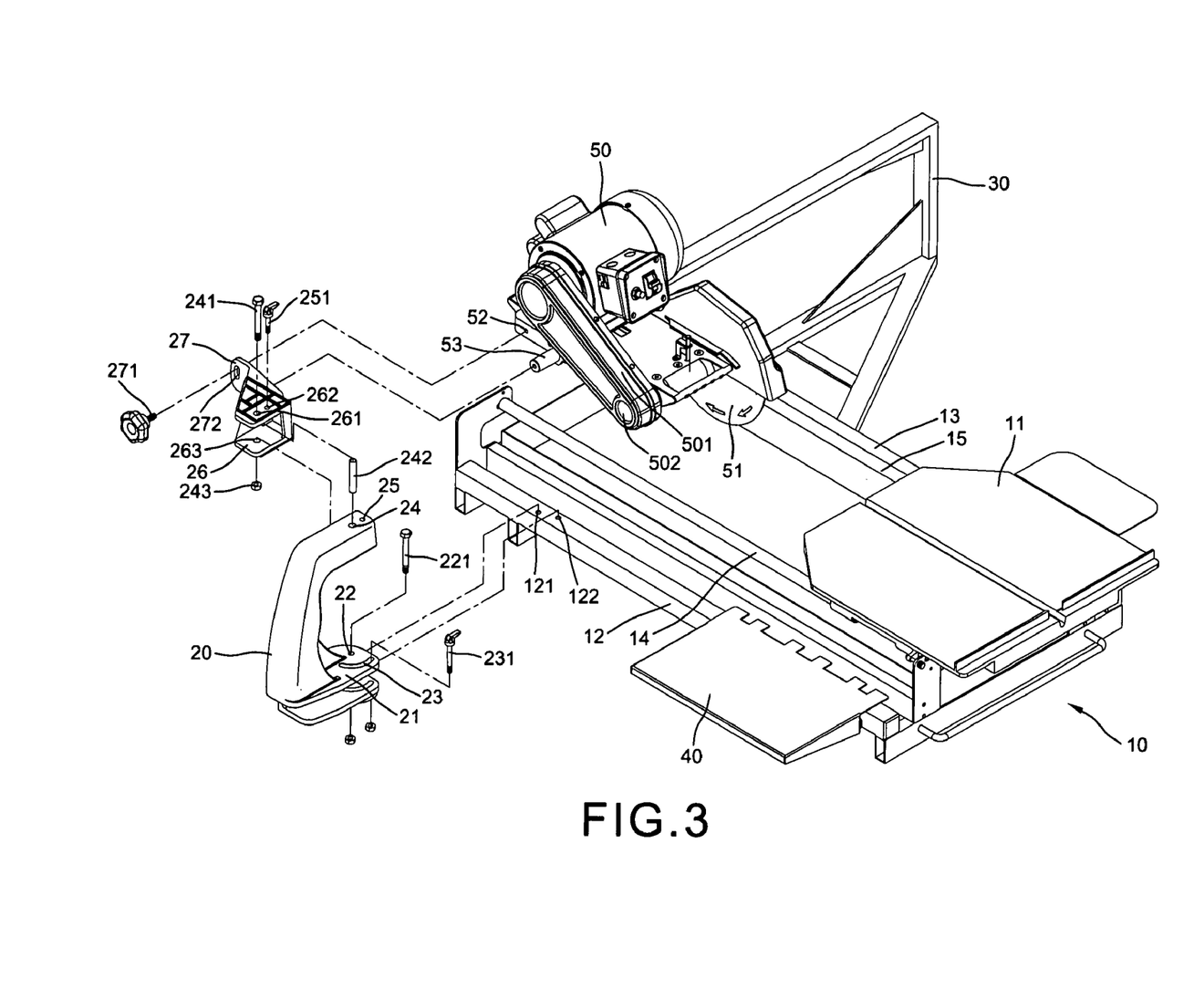
FIG. 3 is an exploded perspective view to show the details of the arcuate support arm.

Due to a greater space is defined between the arcuate support 20 and the supplementary support arm 30, in operation a large sized piece of stone can be passed through the apace without obstruction. The motor 50 is commonly supported by two support arms 20 and 30 that will be more stable. Besides, the adjustment lock 231 can be unfastened to permit the arcuate support arm 20 to turn a certain degree on the screw 221 and both the supplementary support arm 30 and tool plate 40 are removable to reduce the volume of the stone cutter to facilitate packing for transportation. After the supplement support arm 30 is removed, the motor 50 is still supported by the arcuate support arm 20 without taking apart.

Further, the tool plate 40 can be either engaged with the first outer longitudinal bar 12 or the second outer longitudinal bar 13 and avoids the operator to forget the tools and to give convenience to use the tools.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. An improved portable stone cutter comprising:
    a base which is of a rectangular frame composed of a pair of longitudinal bars, a pair of transverse bars, a pair of first and second outer longitudinal bars and a pair of sliding bars longitudinally and parallel disposed inside said frame for slidably disposing a working table thereon, wherein said first outer longitudinal bar having a pair of first and second vertical screw holes spacedly formed in a top of front portion and said second outer longitudinal bar having a first, second and third horizontal screw holes spacedly formed in an outer side of front portion for respectively securing an arcuate support arm and a supplementary support arm to commonly support a motor on front end of said frame, said motor having a screw hole abutting a first protrudent screw hole on a lateral side and a second protrudent screw hole on other lateral side opposite to the first protrudent screw hole;
    a guarded circular saw blade disposed on a front portion of said frame connecting to said motor and operated by said motor via a belt and a transmission shaft;
    a tool plate movably engaged with one of said outer longitudinal bars;
    whereby a large space is defined between said arcuate support arm and said supplementary support arm to enable a large sized piece of stone passing through without obstruction.

2. The portable stone cutter as recited in claim 1, wherein said arcuate support arm has a clamp at lower end for clamping said arcuate support arm to a front portion of said first outer longitudinal bar having a central hole engaged with said first vertical screw hole and rotatably secured by a screw and a crescent slot engaged with said second vertical screw hole and secured by an adjustment lock, a vertical through hole in a top for engaging a tubular pin therein and a vertical screw hole in a top abutting upper end; a U-shaped clamp clamped the upper end of said arcuate support arm having a first and a second through holes spacedly formed in upper portion, a third through hole in lower portion aligned with said first though hole of said support arm and secured by a bolt and a nut, said second through hole engaged with the vertical screw hole of said support arm and secured by an adjustment lock, and a coupling plate on a lateral side thereof including a through hole engaged with said screw hole of said motor and secured by a knobbed screw and an inner surface secured to said first protrudent screw hole of said motor.

3. The portable stone cutter as recited in claim 1, wherein said supplementary support arm has a L-shaped upper bar including a lateral coupling plate with a through hole therein on a free end of a transverse portion engaged with said second protrudent screw hole of said motor and secured by a screw, a lower end of a vertical portion integrated with a peak of an A-shaped seat which is composed of a first and a second tilt bars and a reinforcement transverse bar, a small triangular reinforcement plate integrated with inner side of a junction of said L-shaped upper bar and a large triangular reinforcement plate integrated within a junction between said L-shaped upper bar and the peak of said A-shaped seat, said first tilt bar having a first inverse U-shaped clamp at free end clamping said second outer longitudinal bar of said base and a lateral coupling plate with a through hole engaged with said first horizontal screw hole and secured by a screw, said second tilt bar having a second inverse U-shaped clamp at free end clamping a front portion adjacent front end of said second outer longitudinal bar and a pair of lateral coupling plates each having a through hole respectively engaged with said second and third horizontal screw holes and secured by a pair of screws.

4. The portable stone cutter as recited in claim 1, wherein said tool plate has a plurality of horizontal protrudent pieces and a plurality of vertical protrudent pieces alternately formed along front edge respectively stopping against upper and inner surface of said first outer longitudinal bar, a pair of introverted hollow interior lateral walls respectively formed under lateral edges each having a screw hole in front end with a hollow frustum means on inner side and a pair of bolts screwed into said screw holes and secured by a pair of nuts, said bolts each having an adjustable head stopped against an outer surface of said first outer longitudinal bar.

* * * * *